(12) United States Patent
Nanzer

(10) Patent No.: US 11,308,712 B2
(45) Date of Patent: Apr. 19, 2022

(54) IMAGING SYSTEM USING WIFI SIGNALS

(71) Applicant: Board of Trustees of Michigan State University, East Lansing, MI (US)

(72) Inventor: Jeffrey Nanzer, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 223 days.

(21) Appl. No.: 16/831,967

(22) Filed: Mar. 27, 2020

(65) Prior Publication Data

US 2020/0311420 A1  Oct. 1, 2020

Related U.S. Application Data

(60) Provisional application No. 62/826,360, filed on Mar. 29, 2019.

(51) Int. Cl.
| | |
|---|---|
| G06V 20/00 | (2022.01) |
| G06V 20/10 | (2022.01) |
| G06V 10/143 | (2022.01) |
| G06V 10/147 | (2022.01) |
| G06F 17/14 | (2006.01) |
| G01S 13/00 | (2006.01) |
| G01S 13/89 | (2006.01) |

(52) U.S. Cl.
CPC ............ *G06V 20/00* (2022.01); *G06F 17/141* (2013.01); *G06V 20/194* (2022.01)

(58) Field of Classification Search
None
See application file for complete search history.

(56) References Cited

U.S. PATENT DOCUMENTS

| | | | |
|---|---|---|---|
| 5,227,800 A | * | 7/1993 | Huguenin ............ H01Q 13/085 |
| | | | 250/332 |
| 7,248,204 B2 | | 7/2007 | Lovberg et al. |
| 8,305,255 B2 | | 11/2012 | Margomenos |
| 2009/0289833 A1 | | 11/2009 | Johnson et al. |
| 2011/0102233 A1 | | 5/2011 | Johnson |
| 2011/0273320 A1 | | 11/2011 | Nogueira-Nine |
| 2013/0257646 A1 | * | 10/2013 | Gopalsami .......... G01K 11/006 |
| | | | 342/179 |
| 2015/0293221 A1 | * | 10/2015 | Ahmed ................... G01S 13/89 |
| | | | 342/179 |
| 2019/0187327 A1 | * | 6/2019 | Zhao ....................... G01S 13/89 |
| 2019/0285740 A1 | * | 9/2019 | Boufounos ......... G01S 13/9029 |

FOREIGN PATENT DOCUMENTS

| | | | | | |
|---|---|---|---|---|---|
| CN | | 105216797 A | * | 1/2016 | ...... B60W 30/18163 |
| CN | | 109581526 A | * | 4/2019 | ............. G01V 8/005 |
| WO | WO-2008109946 A1 | | * | 9/2008 | ............ G01S 13/282 |

* cited by examiner

*Primary Examiner* — Mohammed Rachedine
(74) *Attorney, Agent, or Firm* — Harness Dickey & Pierce PLC

(57) ABSTRACT

A passive incoherent millimeter-wave imaging system includes a receiver array including a plurality of receive modules configured to receive a scene signal reflected from a scene. The scene signal is reflected in response to a plurality of incoherent communication signals being reflected off the scene, and the plurality of incoherent communication signals are spatially and temporally incoherent at a point when reaching the scene.

20 Claims, 3 Drawing Sheets

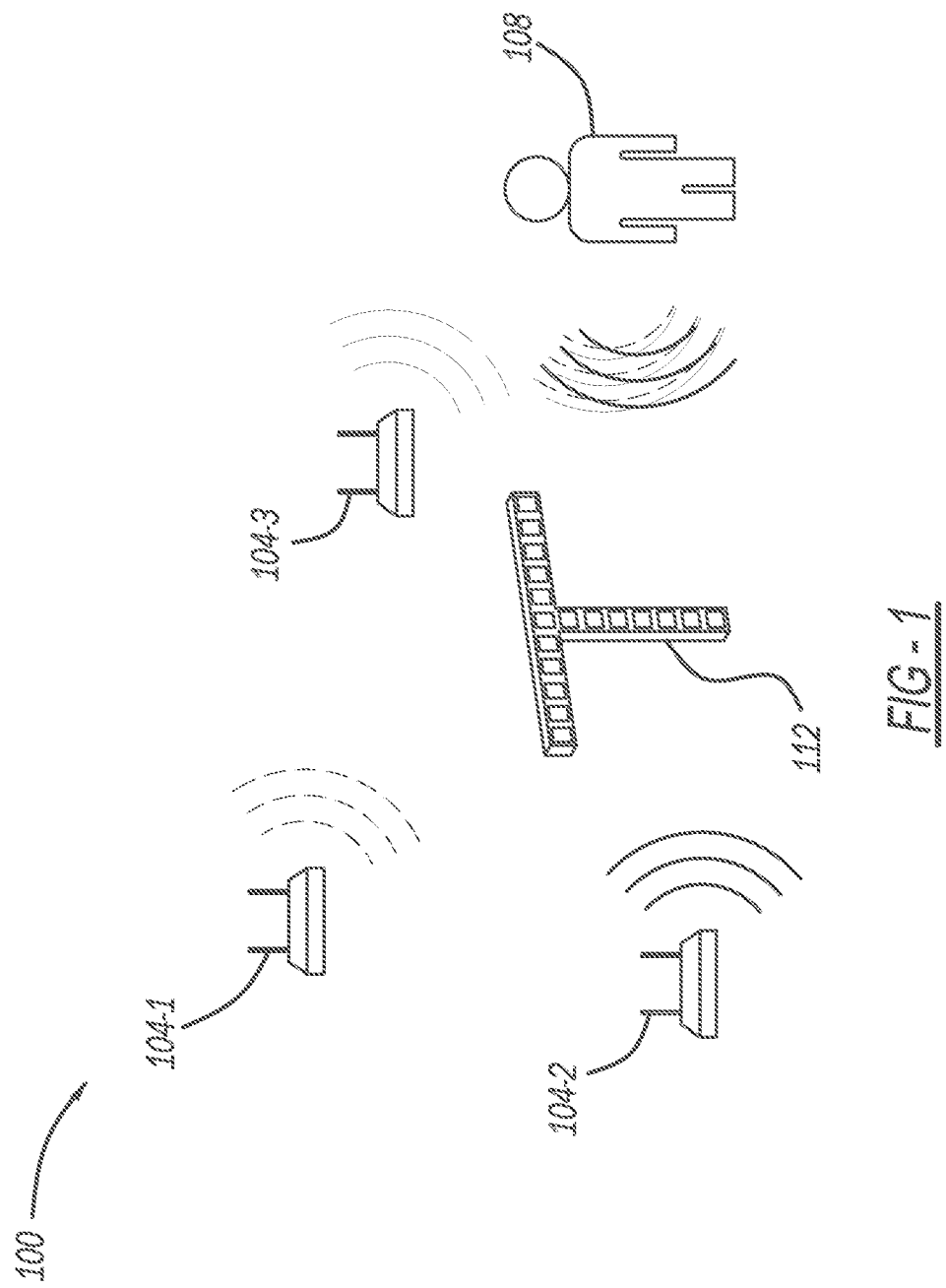

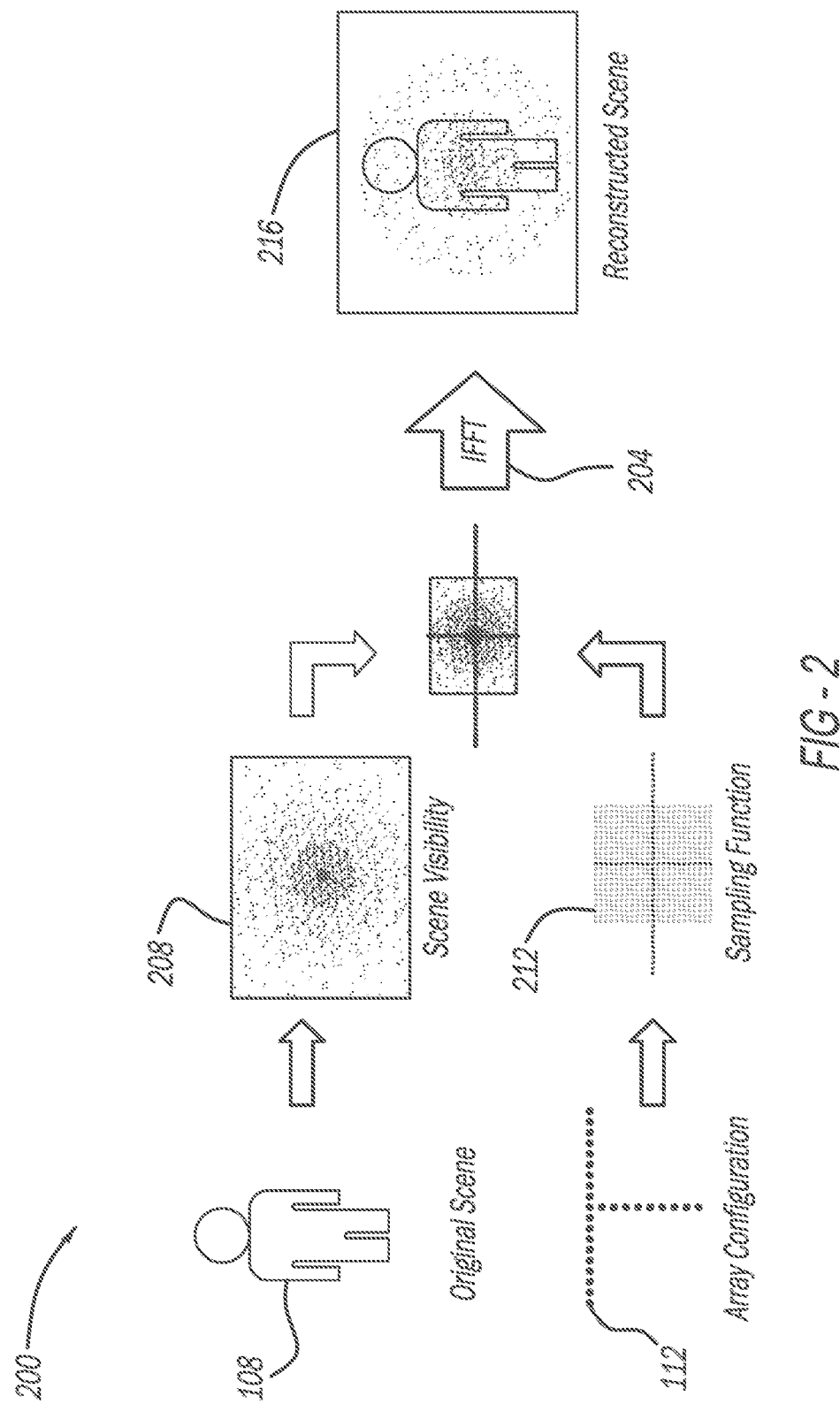

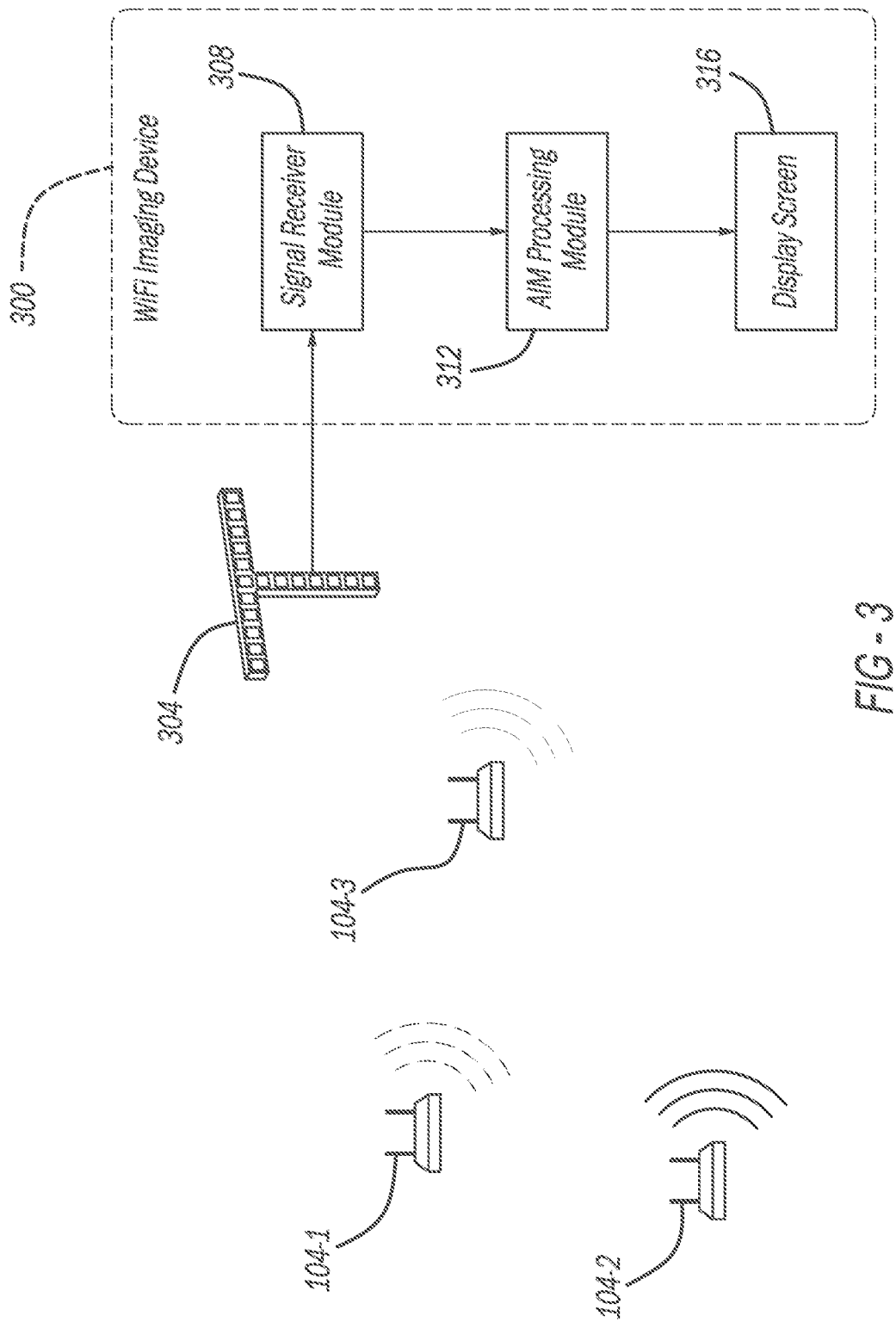

IMAGING SYSTEM USING WIFI SIGNALS

CROSS REFERENCE

This application claims the benefit of U.S. Provisional Application 62/826,360, filed Mar. 29, 2019. The entire disclosure of the above application is incorporated herein by reference.

STATEMENT REGARDING FEDERALLY SPONSORED RESEARCH OR DEVELOPMENT

This invention was made with government support under 1708820 awarded by the National Science Foundation. The government has certain rights in the invention.

FIELD

The present disclosure relates imaging a scene and more particularly to receiving incoherent signals to reconstruct the scene.

BACKGROUND

The use of imagery to convey information has always been widely prevalent in scientific settings and society more broadly due to the inherent human ability to quickly process spatial information. While imagery has traditionally been captured at optical or infrared frequencies, electromagnetic radiation in the microwave and millimeter-wave bands is becoming more widely used for imaging. Wavelengths at these bands are sufficiently so that images can be generated with good resolution, and the signals can easily propagate through smoke, fog, clothing, and even many building materials, which are opaque at optical and infrared wavelengths.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In accordance with the present invention, a passive incoherent millimeter-wave imaging system includes a receiver array including a plurality of receive modules configured to receive a scene signal reflected from a scene. The scene signal is reflected in response to a plurality of incoherent communication signals being reflected off the scene, and the plurality of incoherent communication signals are spatially and temporally incoherent at a point when reaching the scene. In yet another aspect, a passive incoherent millimeter-wave image processing module is configured to construct a reconstructed scene based on the scene signal reflected from the scene, and a display module is configured to display the reconstructed scene.

In further aspects, the passive incoherent millimeter-wave image processing module is configured to construct the reconstructed scene by receiving the scene signal reflected from the scene, determining a scene visibility of the scene signal reflected from the scene, and determining a sampled visibility using the scene visibility and a sampling function. In further aspects, the sampled visibility is a product of the scene visibility and the sampling function. In further aspects, the passive incoherent millimeter-wave image processing module is configured to construct the reconstructed scene by determining an inverse Fourier Transform of the scene signal reflected from the scene.

In further aspects, the plurality of incoherent communication signals are received from a plurality of wireless communication devices. In further aspects, the plurality of incoherent communication signals are received from the plurality of wireless communication devices in response to a distance between the receiver array and each wireless communication device of the plurality of wireless communication devices being less than a predetermined threshold. In further aspects, each communication devices of the plurality of wireless communication device produces an unsynchronized signal that is incoherent at the scene. In further aspects, each communication device of the plurality of wireless communication devices produces a signal at the same or at a different frequency.

In further aspects, each incoherent communication signal of the plurality of incoherent communication signals may be based on different frequency sources. In further aspects, the plurality of incoherent communication signals are received from a plurality of wireless devices. In further aspects, the plurality of incoherent communication signals include at least three incoherent communication signals. In further aspects, the receiver array is configured to receive the scene signal at a set of spatial frequencies, and the set of spatial frequencies are based on a distance and an angle between pairs of receiving modules. In further aspects, the passive incoherent millimeter-wave image processing module constructs the reconstructed scene using spatial frequency sampling.

An imaging system including a receiver array, a display device, and a processor with an associated memory configured to store instructions. The receiver array is configured to receive a scene signal reflected from a scene. The scene signal is reflected in response to a plurality of incoherent communication signals being reflected off the scene. The plurality of incoherent communication signals are spatially and temporally incoherent at a point when reaching the scene. The instructions cause the processor to construct a reconstructed scene by receiving at least three incoherent communication signals reflected off the scene at the receiver array and determining a scene visibility based on the at least three incoherent communication signals. The instructions include identifying a sampling function, calculating a sampled visibility based on the scene visibility and the sampling function, and performing an inverse Fourier transform of the sampled visibility to construct the reconstructed scene.

In further aspects, the receiver array is a sparse array. In further aspects, the receiver array is arranged in a T-shaped configuration. In further aspects, the receiver array is arranged in a Y-shaped configuration. In further aspects, the array is arranged in an arbitrary configuration. In further aspects, the plurality of incoherent communication signals are received from a plurality of wireless communication devices in response to a distance between the receiver array and each wireless communication device of the plurality of wireless communication devices being less than a predetermined threshold. In further aspects, each communication device of the plurality of wireless communication devices produces an unsynchronized signal that is incoherent at the scene and at the same or a different frequency.

A passive incoherent millimeter-wave imaging method includes receiving, from a plurality of communication devices, a scene signals including a plurality of incoherent communication signals reflected off a scene. The scene signal is received by a receiver array including a plurality of receive modules. The plurality of incoherent communication signals are spatially and temporally incoherent at a point when reaching the scene. The method includes constructing a reconstructed scene based on the scene signal reflected from the scene by determining a scene visibility based on the scene signals and identifying a sampling function. The method includes calculating a sampled visibility based on the scene visibility and the sampling function, performing an inverse Fourier transform of the sampled visibility to construct the reconstructed scene, and displaying the reconstructed scene on a display screen.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 1 is a diagrammatic view of an exemplary embodiment of a passive incoherent imaging process leveraging existing communication signals.

FIG. 2 is a diagrammatic view of an exemplary embodiment of image reconstruction using a passive incoherent imaging system.

FIG. 3 is a functional block diagram of an exemplary embodiment of a passive incoherent imaging system.

DETAILED DESCRIPTION

Leveraging the capabilities of existing signals in an environment by receiving the existing signals by a sparse array transmitter provides a method of performing passive incoherent imaging without having to produce or transmit signals. For example, this new method creates microwave imagery by capturing the signals emitted by a small set of wireless WiFi transmitters. The imaging technique leverages the fact that the signals emitted by separate WiFi transmitters are sufficiently statistically independent to create a radiation pattern that is spatially incoherent, enabling the use of spatial frequency sampling using a small set of receiving antennas in a sparse array.

In contrast to traditional microwave imaging, this method requires no mechanical or electrical beam scanning, and no coordination between transmitters and receivers. The WiFi imaging system furthermore requires far less receiver gain than passive microwave imagers and significantly less bandwidth. As an example implementation, a 2-D image reconstruction of reflecting metal spheres using three transmitters emitting independent 16-level quadrature amplitude modulated (16-QAM) signals at 5.5 GHz matching commercial WiFi protocols 802.11n/ac is shown.

Many different techniques of microwave imaging exist, the most common being mechanical and electrical scanning imagers, which are generally limited by the data acquisition time required to physically scan a beam over a desired field of view. Holographic imaging systems have the same drawback. Staring-type imagers that operate similarly to optical cameras have been developed; examples of these include recently introduced compressive imagers, and passive interferometric imagers. The main drawback of compressive imagers is their heavy computational load, as well as the need for bulky quasi-optical apertures. Passive interferometric imagers employ sparse arrays with fewer elements than a filled aperture; however, because they capture the extremely low power thermal radiation emitted by humans and objects, very high sensitivity receivers are needed with wide bandwidth, leading to high system cost.

The use of WiFi signals for sensing applications has seen significant interest in recent years, due in large part to the ubiquitous presence of WiFi signals from access points in areas where people are present, but also because of the commercial availability of devices that communicate with each other using WiFi protocols. Using WiFi for localization of people and devices and detection of moving people through walls have been demonstrated in recent years. While these examples have shown that localization and tracking are possible using WiFi signals, or, in some cases, using non-communication-type signals in the WiFi bands, to date, no systems have been demonstrated that can produce 2-D imagery using such signals. This is due in large part to the fact that WiFi signals tend to be instantaneously spread-spectrum compared to radar signals, making traditional detection and localization using phase-based radar signal processing difficult and often infeasible. However, the instantaneous wideband nature of WiFi can be beneficial in a sensing application if the receiver and signal processing are appropriately designed, as discussed below.

A new form of microwave computational imaging is described that uses WiFi signals from separate, independent routers as the transmitters, combined with a sparse array receiver that captures the image information in the spatial frequency domain. The presently described implementation is inspired from passive radar techniques, where echoes from third-party radiation is used for target tracking and detection. However, rather than performing traditional radar detection and estimation algorithms, in the imaging system of the present disclosure the uncorrelated nature of multiple WiFi signals transmitted from spatially diverse locations enables the use of Fourier-domain spatial sampling to create images. While earlier works on passive imaging systems measure the extremely low-power thermally-generated electromagnetic radiation in the microwave and millimeter-wave bands. To capture this radiation, the receivers must be implemented with very wide bandwidths, in the range of 100 s or 1000 s of MHz, and very high gains, often exceeding 100 dB, combined with integration times on the order of a few milliseconds to seconds. Independent noise transmitters may be implemented in order to bypass the wide bandwidth, high sensitivity, and long integration time requirements. By capturing transmitted WiFi signals, an embodiment of the present disclosure yields higher received signal power, enabling imaging using standard-gain receivers with bandwidths of only 25 MHz and integration time of 10 µs, both an order of magnitude improvement over the state-of-the-art passive imagers. The result is that the imaging technique described can utilize a sparse array with lower-cost commercial hardware compared to other passive techniques and can yield faster image reconstruction. Furthermore, the proposed technique uses existing communications signals in the environment, providing a unique dual-use approach to sensing and communications.

Interferometric Image Reconstruction

Referring now to FIG. 1, a diagrammatic view of an exemplary embodiment of a passive incoherent imaging process leveraging existing communication signals is shown. A WiFi imaging system 100 or passive incoherent imaging system using WiFi signals is based on the fact that a 2-D scene can be represented by the superposition of an infinite series of spatial sinusoidally-varying signals of different spatial frequencies. A 2-D antenna array can capture these signals at different spatial frequencies by pair-wise cross-correlating the response of its elements. If enough signals existing in the environment that correspond to different spatial frequencies are captured, then the scene can be reconstructed in the spatial frequency domain and can be available through an inverse Fourier transform (IFT). First developed in radio astronomy, spatial-frequency imaging used sparse antenna arrays to capture the thermally generated electromagnetic radiation from astronomical sources and created high-resolution image reconstructions. More recently, this imaging approach has been used in security sensing where antenna arrays capture the thermal radiation from humans and other objects.

The WiFi imaging system 100 measures spatial-frequency domain information, called visibility V(u, v), which is the 2-D Fourier transform of the spatial scene intensity I(α, β), with u and v being the two spatial frequency dimensions of the visibility, and α=sinθcosφ, and β=sinθsinφ are the direction cosines relative to u and v. The 2-D visibility is given by:

$$V(u, v) = \iint_{-\infty}^{\infty} I(\alpha, \beta) e^{-j2\pi(u\alpha+v\beta)} d\alpha d\beta. \quad (1)$$

Environment signals emitted by a set of WiFi routers 104-1, 104-2, 104-3 or access points reflects off a scene of interest 108 and is captured by a sparse receiving array 112. Complex data associated with the spatial-frequency-domain information are captured by processing the received signals in the elements pair-wise. For an antenna pair included in the sparse receiving array 112 separated by a baseline D, the spatial frequency is given by u=D/λ(rad$^{-1}$). The sparse receiving array 112 captures information residing in a discrete set of 2-D spatial frequencies; this set is defined by the pair-wise antenna baselines in two dimensions, and is called the sampling function:

$$S(u, v) = \sum_{n}^{N} \sum_{m}^{M} \delta(u-u_n)\delta(v-v_m) \quad (2)$$

where N·M is the maximum number of spatial frequencies (antenna baselines) represented in the sparse receiving array 112.

FIG. 2 is a diagrammatic view of an exemplary embodiment of image reconstruction using a WiFi imaging system 200. The WiFi signals produced by the routers described above reflect off the scene of interest 108 and are received by the sparse receiver array 112. A sampled visibility 204 V$_s$(u, v)=V·S is the product of a scene visibility 208 and a sampling function 212 and represents the information captured by the WiFi imaging system 200.

The Van Cittert-Zernike theorem indicates that the spatial intensity of a scene I, in this example, the scene of interest 108, can be reconstructed 216 from samples of the visibility, through an inverse Fourier transform (IFT) or inverse fast Fourier Transform (IFFT) provided that the signals received by the antennas of the sparse receiving array 112 are spatially and temporally incoherent. In passive interferometric imaging systems, such as those used in radio astronomy, the signal incoherence constraint is met because the signals are thermally generated by the sources of interest. In the WiFi imaging system 100, the signals transmitted by WiFi routers illuminate the scene of interest 108.

Since each router 104-1, 104-2, 104-3 of FIG. 1 transmits a different stream of data and because each router 104-1, 104-2, 104-3 emits signals based on different frequency sources, the resulting signals between multiple routers 104-1, 104-2, 104-3 are largely independent. It can be shown that the radiation from WiFi emissions from multiple routers 104-1, 104-2, 104-3 is sufficiently incoherent by calculating the average spatial mutual coherence of the radiation pattern (commonly used in the compressive sensing field). The signals thus satisfy the Van Cittert-Zernike theorem, enabling image reconstruction using a simple Fourier transform. To ensure that the signal impinging on the scene of interest 112 is spatially and temporally incoherent, 2-D images require three uncorrelated transmitters, ensuring that the signal impinging on the scene of interest 108 is sufficiently uncorrelated in both angular dimensions. With such a transmitter, the received signals are spatially and temporally incoherent, and the reconstructed image I$_r$ is found by:

$$I_r(\alpha, \beta) = \sum_{n}^{N} \sum_{m}^{M} V(u_n, v_m) e^{j2\pi(u_n\alpha+v_m\beta)}. \quad (3)$$

The spatial interpretation of this process can be described using the point spread function (PSF) of the array, which can be found through PSF=IFT{S(u, v)} and in practice includes a main beam and a number of sidelobes. The reconstructed image is given by the convolution of the PSF and the scene intensity, I$_r$=PSF*I.

Referring now to FIG. 3, a functional block diagram of an exemplary embodiment of a WiFi imaging device 300 is shown. The WiFi imaging device 300 is coupled to a receiving array 304, such as a sparse array, and receives a reflected signal from a scene of interest. Signals are transmitted by the routers 104-1, 104-2, 104-3 and the reflected signals are reflected off the scene of interest in response to the signals produced by the routers reaching the scene of interest. The signals produced by the routers are spatially and temporally incoherent at the scene of interest. The signals produced by the routers are incoherent at the scene of interest because each signal is different, the signals are all unsynchronized, and the signals slightly vary from their intended frequency, resulting in the signals being incoherent enough at the scene of interest.

The WiFi imaging device 300 receives the reflected signal for scene reconstruction. A signal receiver module 308 is included in the WiFi imaging device 300 and is configured to receive the reflected signal from the receiving array 304. A passive incoherent millimeter-wave image PIM processing module 312 receives the reflected signal from the signal receiver module 308 and performs image reconstruction using the spatial sampling technique described above. A display screen 316 receives the reconstructed image for display. In various implementations, the WiFi imaging device 300 may be a handheld device that may synthesize a very dense sampling with fewer receiver elements due to a sweeping motion performed by a user, providing additional spatial frequency samples.

The receiving array 304 may have a varying number of receive elements based on a type of image reconstruction performed. For example, fewer receive elements may be needed in the receiving array 304 for performing edge detection of the scene of interest as opposed to performing full image reconstruction.

In various implementations, the routers 104-1, 104-2, 104-3 may be other devices that produce a signal, for example, cell phones, tablets, etc. In order to reconstruct the image of the scene of interest, approximately three to five transmit signals may be used in an environment. Fewer transmit signals from devices such as the routers 104-1, 104-2, 104-3 may result in a degraded reconstructed image while a larger number of devices may improve the quality of the reconstructed image since more spatial frequency sampling may be performed. In various implementations, the signal producing devices are within a threshold distance of the receiver or imaging system in order for the signal to be stronger.

Experimental Results

The WiFi imaging system was demonstrated by creating a 2-D experimental setup operating at 5.5 GHz. Since imaging in 2-D are implemented, three transmitters were used, each emitting pseudo-random 16-QAM signals from 15 dBi antennas. The signals were generated using a Keysight M8190A Arbitrary Waveform Generator, which has only two independent outputs, thus one channel output was split, with one signal fed directly to an antenna and the other delayed through a 7.6 m cable before being fed to another antenna. This additional time delay ensured that the signals incident on the scene were independent and uncorrelated, having the same effect as three independent WiFi transmitters. The scene consisted of two reflecting spheres placed at the center of a 7.3 m antenna range.

For the receiving array, the fact that each antenna collects spatio-temporally incoherent signals from the scene was leveraged, enabling the synthesis of a larger aperture by collecting data pairwise with only two receive antennas, and sequentially moving them to the locations of a 2-D inverse T array. This process yields image formation equivalent to capturing the signals simultaneously in a filled array. To generate experimental results, the receive array had a maximum horizontal dimension of 15λ and a maximum vertical dimension of 8λ, as shown in FIG. 4B, claiming a horizontal and a vertical resolution of 0.13 radians and 0.25 radians respectively. The transmitters were located just outside the span of the receiving array. The received signals were captured using 10 dBi horn antennas, amplified using 20 dB low-noise amplifiers and then downconverted to baseband using quadrature RF mixers. The baseband signals were digitized using a mixed signal oscilloscope, and were processed in MATLAB.

The signal processing consisted of digitally low-pass filtering the response of each element to a bandwidth of 25 MHz, then cross-correlating the responses of each antenna pair corresponding to unique spatial frequencies (redundant baselines were omitted) and reconstructing the visibility of the source. The time duration of the captured waveforms was 10 μs, an order of magnitude less than that of typical passive imaging systems, and which can easily support real-time operation. The reconstructed image was obtained via a 2-D inverse Fourier transform. FIG. 5A shows the two reflecting spheres, residing at an azimuth angle of 0.5 rad. The reconstructed image is shown in FIG. 5B, captured pairwise from the locations of the inverse T-array. FIG. 5C shows the deconvolved image using blind deconvolution with the calculated PSF of the array shown in FIG. 4B. The responses from the two spheres are clearly distinguishable.

The WiFi imaging technique is the first to generate imagery in two angle dimensions using WiFi signals as the illuminators. Furthermore, no connection between the receivers and transmitters are required, with the only necessary information being the statistics of the transmitted signals. Using this technique, full 2-D imagery is possible by capturing the WiFi signals present in typical environments. Due to the ability of WiFi to propagate through building materials, the potential exists for through-wall imaging using ambient WiFi signals. With the first 802.11ad commercial routers, operating at 60 GHz, being already available and enabling even higher resolution, future implementations may yield images with significant resolution capabilities.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

While various embodiments have been disclosed, it should be appreciated that additional variations of the passive incoherent imaging system and method are also envisioned. For example, additional or different hardware components may be used although certain of the present advantages may not be fully realized. It is also noteworthy that any of the preceding features may be interchanged and intermixed with any of the others. Accordingly, any and/or all of the dependent claims may depend from all of their preceding claims and may be combined together in any combination. Variations are not to be regarded as a departure from the present disclosure, and all such modifications are entitled to be included within the scope and spirit of the present invention.

What is claimed is:

1. A passive incoherent millimeter-wave imaging system comprising:
   a receiver array including a plurality of receive modules configured to receive a scene signal reflected from a scene, wherein the scene signal is reflected in response to a plurality of incoherent communication signals being reflected off the scene, and wherein the plurality of incoherent communication signals are spatially and temporally incoherent at a point when reaching the scene;
   a passive incoherent millimeter-wave image processor configured to receive the scene signal reflected from the scene, determining a scene visibility of the scene signal reflected from the scene and construct a reconstructed scene based on a transformation of the scene visibility; and
   a display module configured to display the reconstructed scene.

2. The imaging system of claim 1 wherein the passive incoherent millimeter-wave image processor is configured to construct the reconstructed scene by:
   determining a sampled visibility using the scene visibility and a sampling function.

3. The imaging system of claim 2 wherein the sampled visibility is a product of the scene visibility and the sampling function.

4. The imaging system of claim 2 wherein the passive incoherent millimeter-wave image processor is configured to construct the reconstructed scene by:
   determining an inverse Fourier Transform of the sampled visibility as the transformation to form the reconstructed scene.

5. The imaging system of claim 1 wherein:
   the plurality of incoherent communication signals are received from a plurality of wireless communication devices.

6. The imaging system of claim 5 wherein:
   the plurality of incoherent communication signals are received from the plurality of wireless communication devices in response to a distance between the receiver array and each wireless router of the plurality of wireless communication devices being less than a predetermined threshold.

7. The imaging system of claim 5 wherein:
   each communication device of the plurality of wireless communication devices produces an unsynchronized signal that is incoherent at the scene.

8. The imaging system of claim 7 wherein:
   each communication device of the plurality of wireless communication devices produces a signal at the same or a different frequency.

9. The imaging system of claim 1 wherein:
   each incoherent communication signal of the plurality of incoherent communication signals are based on different frequency sources.

10. The imaging system of claim 1 wherein:
    the plurality of incoherent communication signals are received from a plurality of wireless devices.

11. The imaging system of claim 1 wherein:
    the plurality of incoherent communication signals include at least three incoherent communication signals.

12. The imaging system of claim 1, wherein:
    the receiver array is configured to receive the scene signal at a set of spatial frequencies; and
    the set of spatial frequencies are based on a distance and an angle between pairs of receiving modules.

13. The imaging system of claim 1, wherein the passive incoherent millimeter-wave image processing module constructs the reconstructed scene using spatial frequency sampling.

14. An imaging system comprising:
    (a) a receiver array, a display device, and a processor with an associated memory configured to store instructions, wherein the receiver array is configured to receive a scene signal reflected from a scene, wherein the scene signal is reflected in response to a plurality of incoherent communication signals being reflected off the scene, and wherein the plurality of incoherent communication signals are spatially and temporally incoherent at a point when reaching the scene; and
    (b) the instructions cause the processor to construct a reconstructed scene by:
       receiving at least three incoherent communication signals reflected off the scene at the receiver array;
       determining a scene visibility based on the at least three incoherent communication signals;
       identifying a sampling function;
       calculating a sampled visibility based on the scene visibility and the sampling function; and
       performing an inverse Fourier transform of the sampled visibility to construct the reconstructed scene.

15. The imaging system of claim 14 wherein:
    the receiver array is a sparse array.

16. The imaging system of claim 14 wherein the receiver array is arranged in a T-shaped configuration.

17. The imaging system of claim 14 wherein the receiver array is arranged in a Y-shaped configuration.

18. The imaging system of claim 14 wherein:
    the plurality of incoherent communication signals are received from a plurality of wireless communication devices in response to a distance between the receiver array and each wireless communication device of the plurality of wireless communication devices being less than a predetermined threshold.

19. The imaging system of claim 18 wherein:
    each communication device of the plurality of wireless communication devices produces an unsynchronized signal that is incoherent at the scene and at the same or a different frequency.

20. An passive incoherent millimeter-wave imaging method comprising:
    receiving, from a plurality of communication devices, a scene signals including a plurality of incoherent communication signals reflected off a scene, wherein the scene signal is received by a receiver array including a plurality of receive modules, and wherein the plurality of incoherent communication signals are spatially and temporally incoherent at a point when reaching the scene;
constructing a reconstructed scene based on the scene signal reflected from the scene by:
  determining a scene visibility based on the scene signals;
  identifying a sampling function;
  calculating a sampled visibility based on the scene visibility and the sampling function; and
  performing an inverse Fourier transform of the sampled visibility to construct the reconstructed scene; and
displaying the reconstructed scene on a display screen.

* * * * *